US009824301B2

(12) United States Patent
Chen

(10) Patent No.: US 9,824,301 B2
(45) Date of Patent: Nov. 21, 2017

(54) INFORMATION PROCESSING APPARATUS, INFORMATION PROCESSING METHOD, AND NON-TRANSITORY COMPUTER READABLE STORAGE MEDIUM

(71) Applicant: CANON KABUSHIKI KAISHA, Tokyo (JP)

(72) Inventor: Tsewei Chen, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 15/139,603

(22) Filed: Apr. 27, 2016

(65) Prior Publication Data

US 2016/0321521 A1 Nov. 3, 2016

(30) Foreign Application Priority Data

Apr. 30, 2015 (JP) ................. 2015-093516

(51) Int. Cl.
G06K 9/62 (2006.01)
G06K 9/54 (2006.01)
G06K 9/00 (2006.01)

(52) U.S. Cl.
CPC ......... G06K 9/6282 (2013.01); G06K 9/6257 (2013.01); G06K 9/6286 (2013.01); G06K 9/00228 (2013.01)

(58) Field of Classification Search
CPC .. G06K 9/6282; G06K 9/6257; G06K 9/6286; G06K 9/00228; G06K 9/03; G06K 9/6857; G06K 9/6807; G06K 9/685

(Continued)

(56) References Cited

U.S. PATENT DOCUMENTS 7,835,549 B2 * 11/2010 Kitamura ........... G06K 9/00248
382/118
8,165,408 B2 * 4/2012 Fukaya ............... G06K 9/00228
382/155

(Continued)

FOREIGN PATENT DOCUMENTS

JP 2012247940 A 12/2012

OTHER PUBLICATIONS

Viola et al. "Rapid Object Detection using a Boosted Cascade of Simple Features." Proc. IEEE Conf. on Computer Vision and Pattern Recognition. Dec. 2001: 9. vol. 1.

(Continued)

Primary Examiner — Sheela C Chawan
(74) Attorney, Agent, or Firm — Rossi, Kimms & McDowell LLP

(57) ABSTRACT

In an information processing apparatus that includes sequences of weak classifiers which are logically cascade-connected in each sequence and the sequences respectively correspond to categories of an object and in which the weak classifiers are grouped into at least a first group and a second group in the order of connection, classification processing by weak classifiers belonging to the first group of respective categories is performed by pipeline processing. Based on the processing results of the weak classifiers belonging to the first group of the respective categories, categories in which classification processing by weak classifiers belonging to the second group is to be performed are decided out of the categories. The classification processing by the weak classifiers respectively corresponding to the decided categories and belonging to the second group is performed by pipeline processing.

9 Claims, 10 Drawing Sheets

(58) Field of Classification Search
USPC .......................... 382/224, 225, 227, 303, 304
See application file for complete search history.

(56) References Cited

U.S. PATENT DOCUMENTS

| 8,175,333 | B2* | 5/2012 | Eaton | G06F 15/16 |
|---|---|---|---|---|
| | | | | 382/103 |
| 8,792,731 | B2* | 7/2014 | Fukuda | G06K 9/00973 |
| | | | | 382/181 |
| 9,593,982 | B2* | 3/2017 | Rhoads | G01J 3/513 |

OTHER PUBLICATIONS

Cho et al. "Hardware Acceleration of Multi-view Face Detection." IEEE 7th Symposium on Application Specific Processors. Jul. 2009: 4.

* cited by examiner

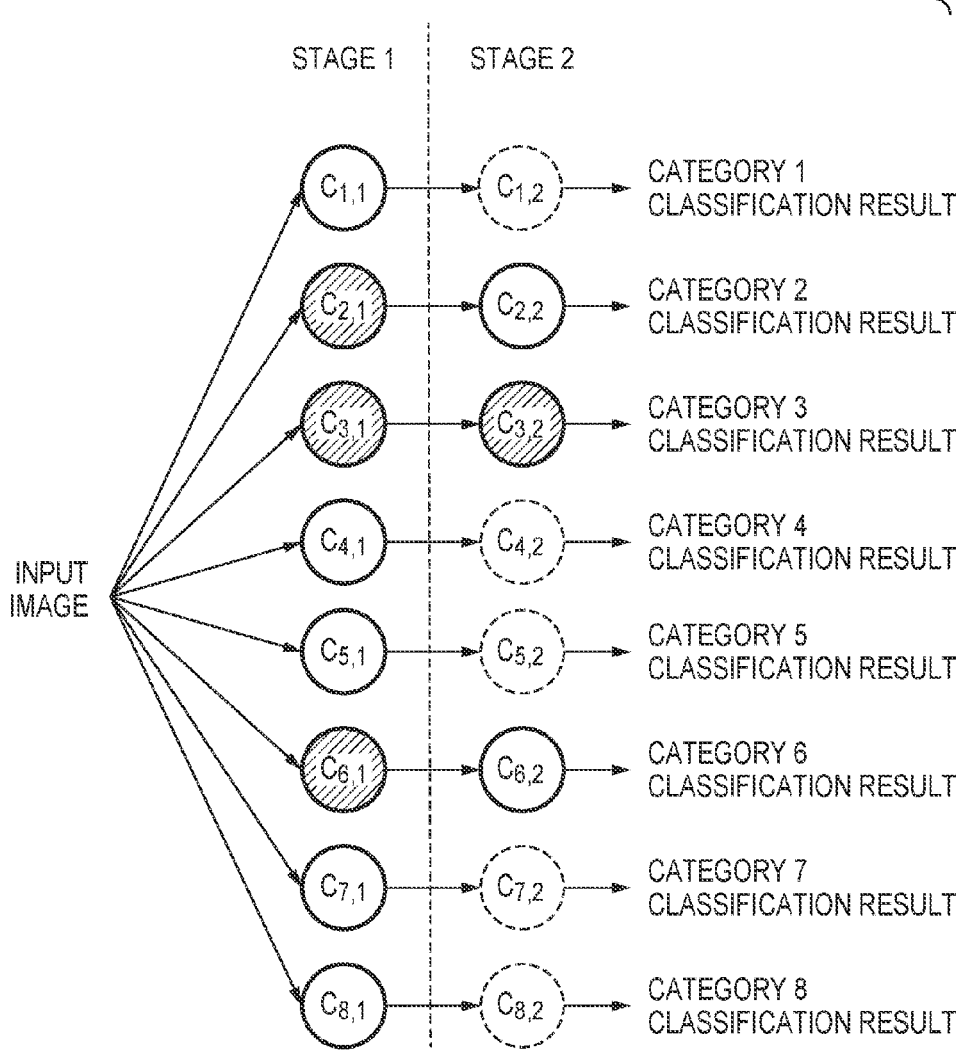

F I G. 4

| CYCLE | 1 | ... | 7 | ... | 13 | ... | 19 | ... | 25 | ... | 31 |
|---|---|---|---|---|---|---|---|---|---|---|---|
| START OF PROCESSING | $C_{1,1}$ | | $C_{2,1}$ | | $C_{2,2}$ | | $C_{3,1}$ | | $C_{3,2}$ | | $C_{4,1}$ |
| END OF PROCESSING | | | $C_{1,1}$ | | $C_{2,1}$ | | $C_{2,2}$ | | $C_{3,1}$ | | $C_{3,2}$ |

| CYCLE | 37 | ... | 43 | ... | 49 | ... | 55 | ... | 61 | ... | 67 |
|---|---|---|---|---|---|---|---|---|---|---|---|
| START OF PROCESSING | $C_{5,1}$ | | $C_{6,1}$ | | $C_{6,2}$ | | $C_{7,1}$ | | $C_{8,1}$ | | |
| END OF PROCESSING | $C_{4,1}$ | | $C_{5,1}$ | | $C_{6,1}$ | | $C_{6,2}$ | | $C_{7,1}$ | | $C_{8,1}$ |

F I G. 5

| CYCLE | 1 | ... | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|
| START OF PROCESSING | $C_{1,1}$ | | $C_{7,1}$ | $C_{8,1}$ | $C_{3,1}$ | $C_{4,1}$ | $C_{5,1}$ | $C_{6,1}$ | $C_{7,1}$ | $C_{8,1}$ | $C_{2,2}$ | $C_{3,2}$ | $C_{6,2}$ | | | | | | |
| END OF PROCESSING | | | $C_{1,1}$ | $C_{2,1}$ | $C_{2,1}$ | $C_{2,1}$ | $C_{2,1}$ | $C_{2,1}$ | $C_{2,1}$ | $C_{2,1}$ | | | | | | | $C_{2,2}$ | $C_{3,2}$ | $C_{6,2}$ |
| CLASSIFICATION RESULT HOLDING UNIT | $F_1$ | | | | $C_{3,1}$ | $C_{3,1}$ | $C_{3,1}$ | $C_{3,1}$ | $C_{3,1}$ | $C_{3,1}$ | $C_{3,1}$ | | | | | | | | |
| | $F_2$ | | | | | | | $C_{6,1}$ | $C_{6,1}$ | $C_{6,1}$ | $C_{6,1}$ | $C_{6,1}$ | | | | | | | |
| | $F_3$ | | | | | | | | | | | | | | | | | | |

FIG. 8

| TIME | 1 | ... | 7 | 8 | 9 | 10 | 11 | 12 | 13 | 14 | 15 | 16 | 17 | 18 |
|---|---|---|---|---|---|---|---|---|---|---|---|---|---|---|
| START OF PROCESSING | $C_{1,1}$ | ... | $C_{7,1}$ | $C_{8,1}$ | $C_{2,2}$ | $C_{3,2}$ | | | | | | | | |
| END OF PROCESSING | | | $C_{1,1}$ | $C_{2,1}$ | $C_{3,1}$ | $C_{4,1}$ | $C_{5,1}$ | $C_{6,1}$ | $C_{7,1}$ | $C_{8,1}$ | $C_{2,2}$ | $C_{3,2}$ | | |
| CLASSIFICATION RESULT HOLDING UNIT $F_1$ | | | | | $C_{3,1}$ | | | | | | | | | |
| $F_2$ | | | | $C_{2,1}$ | | | | $C_{6,2}$ | | | | | | $C_{6,2}$ |
| $F_3$ | | | | | | | | | | | | | | |

FIG. 10

| TIME | 1 | ... | 7 | 8 | 9 | 10 | 11 | 12 | 13 | 14 | 15 | 16 | 17 |
|---|---|---|---|---|---|---|---|---|---|---|---|---|---|
| START OF PROCESSING | C2,1 | ... | C7,1 | C8,1 | C2,2 | C3,2 | C6,2 | | | | | | |
| END OF PROCESSING | | | C2,1 | C3,1 | C6,1 | C1,1 | C4,1 | C5,1 | C7,1 | C8,1 | C2,2 | C3,2 | C6,2 |
| CLASSIFICATION RESULT HOLDING UNIT | F1 | | C2,1 | C2,1 | C3,1 | C6,1 | | | | | | | |
| | F2 | | | C3,1 | C6,1 | | | | | | | | |
| | F3 | | | | | | | | | | | | |

INFORMATION PROCESSING APPARATUS, INFORMATION PROCESSING METHOD, AND NON-TRANSITORY COMPUTER READABLE STORAGE MEDIUM

BACKGROUND OF THE INVENTION

Field of the Invention

The present invention relates to a technique for classifying an object in an image.

Description of the Related Art

There is proposed a technique for classifying a specific object such as a human body or face in an image. Particularly, in recent years, a high-speed low-cost object classification method for an embedded system such as a mobile terminal or a device installed in a car has received attention.

In P. Viola, M. Jones, "Rapid Object Detection using a Boosted Cascade of Simple Features", Proc. IEEE Conf. on Computer Vision and Pattern Recognition, Vol. 1, pp. 511-518, December 2001, an algorithm for increasing the speed of object detection is proposed. According to this algorithm, weak classifiers in a series generated by boosting learning are sequentially processed. Then, based on the classification result of each weak classifier, whether to process the next weak classifiers is determined. If it is determined not to process the next weak classifiers, the processing of the remaining weak classifiers is omitted.

Japanese Patent Laid-Open No. 2012-247940 proposes a technique to efficiently perform classification processing. As a method of solution, the processing time is reduced by efficiently combining spatial parallelism and pipeline parallelism.

In Junguk Cho, et al., "Hardware acceleration of multi-view face detection," IEEE 7th Symposium on Application Specific Processors, pp. 66-69, July 2009, a hardware implementation method for increasing the speed of face detection is proposed. In this method, weak classifiers for classifying faces of a plurality of categories (the orientation and the like) are processed by spatial parallelism to reduce the processing time.

Classification processing by a plurality of cascade-connected weak classifiers (Japanese Patent Laid-Open No. 2012-247940, P. Viola, M. Jones, "Rapid Object Detection using a Boosted Cascade of Simple Features", Proc. IEEE Conf. on Computer Vision and Pattern Recognition, Vol. 1, pp. 511-518, December 2001, and Junguk Cho, et al., "Hardware acceleration of multi-view face detection," IEEE 7th Symposium on Application Specific Processors, pp. 66-69, July. 2009) is a technique often used as a high-speed and low-cost method for object classification. To improve the classification accuracy of the classification target for all kinds of orientation variations of the classification target object, there is a method that categorizes the variations and performs classification by using a plurality of weak classifiers set in a cascade arrangement for each category. The total number of weak classifiers increases together with the increase in the categories of classification targets.

In order to increase the speed of the weak classifiers corresponding to the plurality of categories, a processing device is provided for each category and weak classifiers of a plurality of categories are simultaneously processed in Junguk Cho, et al., "Hardware acceleration of multi-view face detection," IEEE 7th Symposium on Application Specific Processors, pp. 66-69, July. 2009. However, since the processing end times of the weak classifiers of the respective categories vary, the processing device of each category that has completed the processing is not used and the idle time is long. Therefore, in order to perform real-time object classification processing that corresponds to a plurality of categories in an embedded system, it is necessary to use and rapidly process a limited number of processing devices.

SUMMARY OF THE INVENTION

The present invention has been made in consideration of the above problem and provides a technique to rapidly classify an object in an image.

According to the first aspect of the present invention, there is provided an information processing apparatus that includes a plurality of sequences of weak classifiers which are logically cascade-connected in each sequence and the sequences respectively correspond to a plurality of categories of an object and in which the plurality of weak classifiers are grouped into at least a first group and a second group in the order of connection, comprising: a first control unit configured to control to perform, by pipeline processing, classification processing by weak classifiers belonging to the first group in the sequences respectively corresponding to the plurality of categories; a decision unit configured to decide, based on results of classification processing by the weak classifiers belonging to the first group in the sequences respectively corresponding to the plurality of categories, categories for which classification processing are to be performed by weak classifiers belonging to the second group out of the plurality of categories; and a second control unit configured to control to perform, by pipeline processing, classification processing by the weak classifiers belonging to the second group in sequences respectively corresponding to the categories decided by the decision unit.

According to the second aspect of the present invention, there is provided an information processing method performed by an information processing apparatus that includes a plurality of sequences of weak classifiers which are logically cascade-connected in each sequence and the sequences respectively correspond to a plurality of categories of an object and in which the plurality of weak classifiers are grouped into at least a first group and a second group in the order of connection, comprising: performing, by pipeline processing, classification processing by weak classifiers belonging to the first group in the sequences respectively corresponding to the plurality of categories; deciding, based on results of classification processing by the weak classifiers belonging to the first group in the sequences respectively corresponding to the plurality of categories, categories for which classification processing are to be performed by weak classifiers belonging to the second group out of the plurality of categories; and performing, by pipeline processing, classification processing by the weak classifiers belonging to the second group in sequences respectively corresponding to the decided categories.

According to the third aspect of the present invention, there is provided a non-transitory computer-readable storage medium storing a computer program for causing a computer, that includes a plurality of sequences of weak classifiers which are logically cascade-connected in each sequence and the sequences respectively correspond to a plurality of categories of an object and in which the plurality of weak classifiers are grouped into at least a first group and a second group in the order of connection, to function as a first control unit configured to control to perform, by pipeline processing, classification processing by weak classifiers belonging to the first group in the sequences respectively corresponding to the plurality of categories; a decision unit configured to decide, based on results of classification processing by the weak classifiers belonging to the first group in the sequences respectively corresponding to the plurality of categories, categories for which classification processing are to be performed by weak classifiers belonging to the second group out of the plurality of categories; and a second control unit configured to control to perform, by pipeline processing, classification processing by the weak classifiers belonging to the second group in sequences respectively corresponding to the categories decided by the decision unit.

Further features of the present invention will become apparent from the following description of exemplary embodiments (with reference to the attached drawings).

BRIEF DESCRIPTION OF THE DRAWINGS

FIG. 3 is a view for explaining an example of the object classification processing;

FIG. 4 is a view showing general processing of processing a weak classifier belonging to a category by each category;

FIG. 5 is a view for explaining an example of the object classification processing;

FIG. 8 is a view showing states of each cycle in object classification processing;

FIG. 10 is a view for explaining the object classification processing;

DESCRIPTION OF THE EMBODIMENTS

Figure 1:
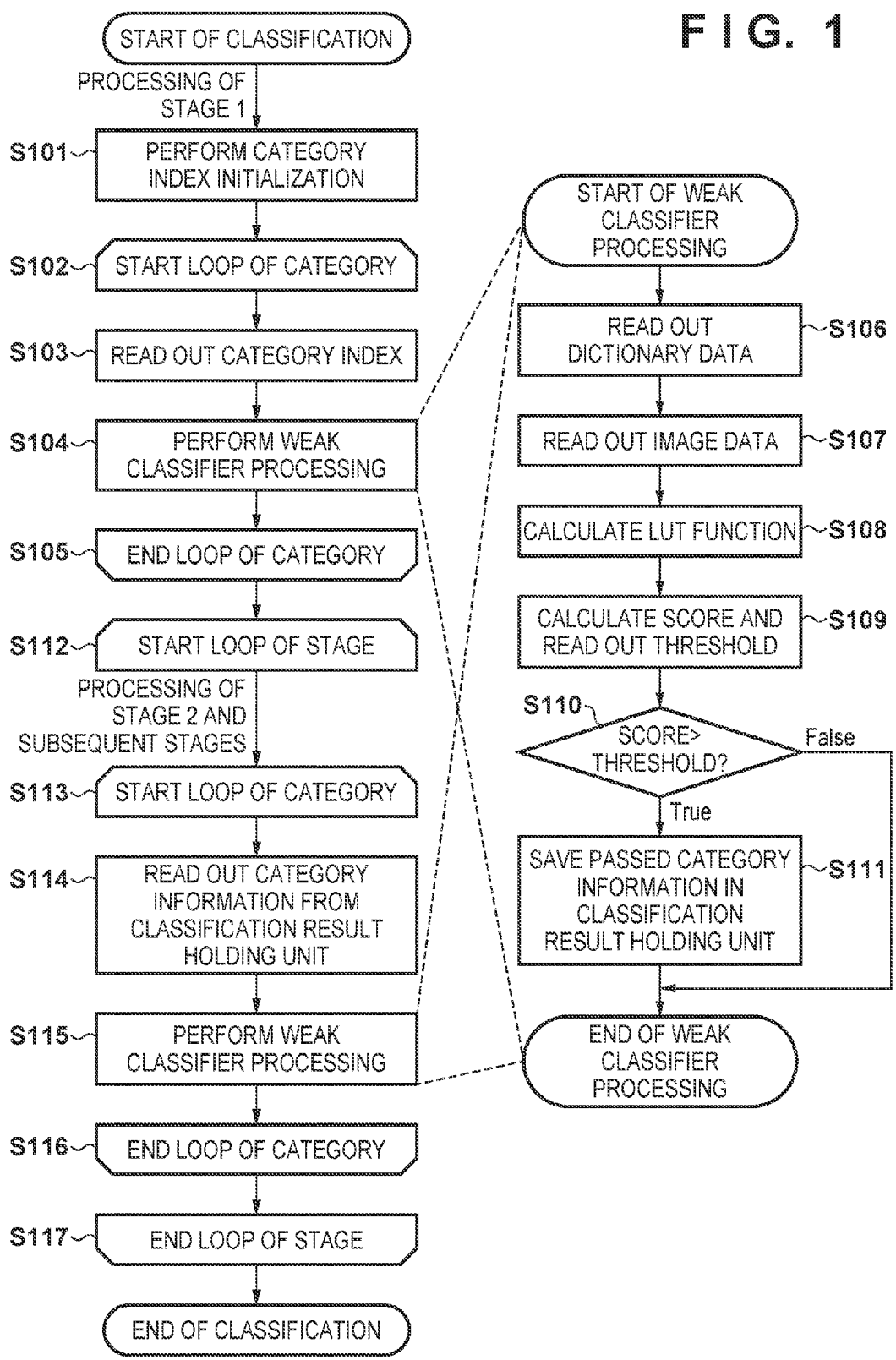
FIG. 1 is a flowchart of object classification processing which is performed on an input image by an object classification apparatus.

Embodiments of the present invention will be described below with reference to the accompanying drawings. Note that the embodiments to be described below are merely examples when the present invention is practiced concretely, and are practical embodiments of arrangements described in the appended claims.

First Embodiment

An example of an information processing apparatus that includes a plurality of sequences of weak classifiers which are logically cascade-connected in each sequence and the sequences respectively correspond to a plurality of categories of an object and in which the plurality of weak classifiers are grouped into at least a first group and a second group in the order of connection will be described in the first embodiment. More specifically, classification processing by weak classifiers belonging to the first group in the sequences respectively corresponding to the plurality of categories is performed by pipeline processing. Then, based on the results of classification processing by the weak classifiers belonging to the first group in the sequences respectively corresponding to the plurality of categories, categories in which weak classifiers belonging to the second group should perform classification processing are decided out of the plurality of categories. Subsequently, an example of an information processing apparatus that performs, by pipeline processing, classification processing to be performed by the weak classifiers belonging to the second group in sequences respectively corresponding to the decided categories will be described.

The first embodiment will describe a case in which such an information processing apparatus is applied to an object classification apparatus which classifies the categories of an object included in an input image. First, an example of the arrangement of the object classification apparatus according to the first embodiment will be described with reference to a block diagram of FIG. 7.

A buffer 701 is a memory for storing an input image input from an external apparatus or transferred from a memory inside the apparatus itself. In the following explanation, assume that an object which is to be a category classification target is included in this input image.

A weak classifier processing unit 703 includes a plurality of sequences of weak classifiers. Each sequence includes a plurality of weak classifiers which are logically cascade-connected and a sequence is provided for each category of an object. The weak classifier processing unit 703 uses dictionary data stored in a RAM (Random Access Memory) 704 and LUT (Look-Up Table) data to time-divisionally operate the weak classifiers for each category. This allows the weak classifier processing unit 703 to perform classification processing on an object that is included in the input image stored in the buffer 701. In the following explanation, the act of causing the weak classifier to operate will sometimes be described as "processing (performing) the weak classifier". In addition, a description about the dictionary data and LUT data will be given later.

Figure 2:
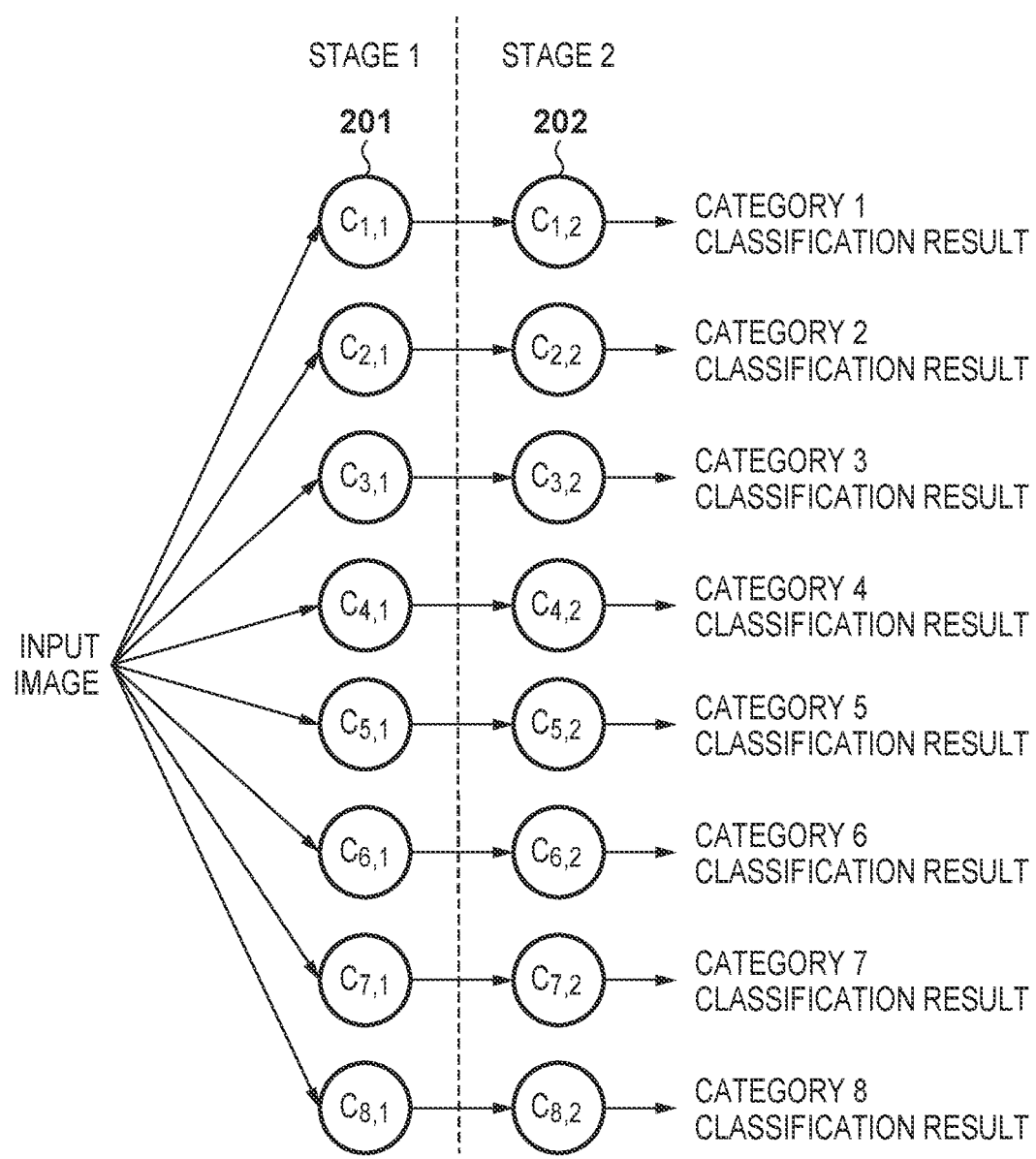
FIG. 2 shows an example of weak classifiers.

The weak classifiers of each category included in the weak classifier processing unit 703 will be described with reference to the example in FIG. 2. The number of categories is eight in FIG. 2. This means that the weak classifier processing unit 703 is to perform classification processing for each of the eight categories on an object included in an input image. Additionally, in FIG. 2, there are two cascade-connected weak classifiers provided for each of the eight categories (categories 1 to 8), and weak classifiers for each category are constituted by a pair of weak classifiers, a weak classifier 201 (stage 1 classifier) which operates first and a weak classifier 202 (stage 2 classifier) which operates second. In FIG. 2, out of the two weak classifiers corresponding to category c ($1 \leq c \leq 8$), the stage 1 weak classifier and the stage 2 weak classifier are represented by $C_{c,1}$ and $C_{c,2}$, respectively.

In the first embodiment, as shown in FIG. 2, assume that there are eight categories and weak classifiers, in which a stage 1 weak classifier $C_{c,1}$ and a stage 2 weak classifier $C_{c,2}$ are cascade-connected, are provided for each category c ($1 \leq c \leq 8$). In such an arrangement according to the first embodiment, the stage 1 weak classifier $C_{c,1}$ of each category c is performed by pipeline processing. Then, depending on the processing result of the stage 1 weak classifier $C_{c,1}$ in each category c, each category in which the stage 2 weak classifier $C_{c,2}$ is to be performed by pipeline processing (that is, each category that is to be a classification target in the stage 2) is decided out of the categories c. Subsequently, the stage 2 weak classifier $C_{c,2}$ of each decided category is performed by pipeline processing.

In addition, the weak classifiers to be performed by pipeline processing in each stage are performed in the order of the categories. As the order of performance, assume that an upper category in FIG. 2 will be performed first in the first embodiment.

Referring back to FIG. 7, the RAM 704 stores the dictionary data and LUT data as described above. The RAM 704 includes a work area to be used by a control unit 702 and the weak classifier processing unit 703 to perform various processes. In this manner, the RAM 704 can appropriately provide various types of areas.

A classification result holding unit 705 is a unit for storing a processing result by the weak classifier processing unit 703.

A initialization information holding unit 706 is a unit for storing information indicating the performance order of the weak classifiers $C_{c,1}$ of stage 1.

The control unit 702 performs operation control of the entire object classification apparatus including the units described above.

Next, object classification processing performed on an input image by the object classification apparatus according to the first embodiment will be described with reference to the flowchart of the processing shown in FIG. 1.

<Step S101>

The control unit 702 stores information (performance order information) indicating the performance order of stage 1 weak classifiers $C_{c,1}$ for the respective categories c is stored in the initialization information holding unit 706. In this case, category numbers (category indices) aligned in processing order are stored as pieces of information indicating the performance order of the stage 1 weak classifiers $C_{c,1}$ in the initialization information holding unit 706. In the first embodiment, since pipeline processing is performed in the order of $C_{1,1}$, $C_{2,1}$, $C_{3,1}$, $C_{4,1}$, $C_{5,1}$, $C_{6,1}$, $C_{7,1}$, and $C_{8,1}$, information indicating "1→2→3→4→5→6→7→8" is stored as the performance order information in the initialization information holding unit 706. Such performance order information can be input by a user by using an operation unit (not shown) or decided by the object classification apparatus in accordance with some kind of a reference.

Next, in steps S102 to S105, the weak classifier processing unit 703 performs the stage 1 weak classifiers $C_{1,1}$ to $C_{8,1}$ of the respective categories by pipeline processing in this order.

<Step S103>

The weak classifier processing unit 703 first refers to the performance order information stored in the initialization information holding unit 706 and reads out the category index of the category to be processed this time. In the case of the first embodiment, the category index=1 is read out in the first step S103, and the category index=N is read out in the Nth (1<N≤8) step S103.

<Step S104>

If a category index c has been read out from the initialization information holding unit 706 by the weak classifier processing unit 703 in step S103, the weak classifier processing unit 703 performs the weak classifier $C_{c,1}$ and obtains the classification result of the input image by the weak classifier $C_{c,1}$. At this time, the processes of steps S106 to S111 are performed in step S104.

<Step S106>

The weak classifier processing unit 703 reads out the dictionary data corresponding to the weak classifier $C_{c,1}$ from the RAM 704. In the first embodiment, assume that "dictionary data corresponding to the weak classifier $C_{c,1}$" is "data which indicates the pixel position corresponding to the weak classifier $C_{c,1}$ in the input image" and that the dictionary data differs in each weak classifier. In general, dictionary data $D_{c,i}$ corresponding to a weak classifier $C_{c,i}$ is expressed as:

$$D_{c,i}=(X_{c,i},Y_{c,i}) \quad (1)$$

where $X_{c,i}$ and $Y_{c,i}$ respectively indicate the x-coordinate value and the y-coordinate value corresponding to the weak classifier $C_{c,i}$ in the input image. Note that although the dictionary data of the weak classifier is assumed to be a pixel position of one pixel in the input image for the sake of descriptive convenience in this embodiment, the present invention is not limited to this. Pixel positions of a plurality of pixels can be set as the dictionary data.

<Step S107>

The weak classifier processing unit 703 reads out, from the input image stored in the buffer 701, a pixel value $f(X_{c,1}, Y_{c,1})$ of the pixel position indicated by the dictionary data $D_{c,1}$. Note that a feature amount which is acquired by using a pixel value of one or a plurality of pixels can be used instead of the pixel value.

<Step S108>

The weak classifier processing unit 703 reads out LUT data corresponding to the weak classifier $C_{c,1}$ from the RAM 704. In the first embodiment, assume that "LUT data corresponding to the weak classifier $C_{c,1}$" is "data representing a function to convert the image feature amount (pixel value in this case) of the weak classifier $C_{c,1}$ read out in step S107 into a score (evaluation value) that corresponds to the likelihood of the target object". In general, a function $L_{c,i}$ represented by the LUT data corresponding to the weak classifier $C_{c,i}$ is expressed as:

$$S_{c,i}=L_{c,i}(f(X_{c,i},Y_{c,i})) \quad (2)$$

where $S_{c,i}$ is a score obtained by converting a pixel value $f(X_{c,i}, Y_{c,i})$ using the function $L_{c,i}$.

<Step S109>

The weak classifier processing unit 703 obtains a score $S_{c,1}$ by converting the pixel value $f(X_{c,1}, Y_{c,1})$ using the function $L_{c,1}$. Furthermore, the weak classifier processing unit 703 reads out a threshold $T_{c,1}$ corresponding to the weak classifier $C_{c,1}$ from the RAM 704.

<Step S110>

The weak classifier processing unit 703 compares the magnitudes of the score $S_{c,1}$ and the threshold $T_{c,1}$. If $S_{c,1}>T_{c,1}$, the process advances to step S111. On the other hand, if $S_{c,1}\leq T_{c,1}$, the process advances to step S105, and the processes of step S103 and subsequent steps are performed on the next category.

<Step S111>

The weak classifier processing unit 703 associates the category index c and the classification result of the weak classifier $C_{c,1}$ and stores the associated index and result in the classification result holding unit 705.

By performing the loop of steps S102 to S105 for each of the category indices 1 to 8, a category that has a score exceeding the threshold out of the categories 1 to 8 is stored in the classification result holding unit 705 as a category that has passed stage 1 in association with the category index c of the category and the classification result by the stage 1 weak classifier of the category. On the other hand, the processing of a category that has a score which is equal to or less than the threshold is terminated, and nothing is stored in the classification result holding unit 705.

Next, in steps S112 to S117, the weak classifier processing unit 703 performs classification processing of each stage in stage 2 and subsequent stages. In the first embodiment, the classification processing of stage 2 is performed by pipeline processing for each category corresponding to a category index stored in the classification result holding unit 705.

<Step S114>

The weak classifier processing unit 703 selects, out of the category indices stored in the classification result holding unit 705, an unselected category c which has a preceding performance order in the performance order indicated in the above-described performance order information.

<Step S115>

The weak classifier processing unit 703 performs the weak classifier $C_{c,2}$ and obtains the classification result of the input image by the weak classifier $C_{c,2}$. At this time, processes of steps S106 to S111 are also performed in step S115, and the target category is set as category 2. In this case, in step S106, dictionary data corresponding to the weak classifier $C_{c,2}$ is read out. In step S107, a pixel value $f(X_{c,2}, Y_{c,2})$ is read out, and LUT data corresponding to the weak classifier $C_{c,2}$ is read out in step S108. Then, in step S109, a score $S_{c,2}$ is obtained by converting the pixel value $f(X_{c,2}, Y_{c,2})$ by a function $L_{c,2}$, and the magnitudes of the score $S_{c,2}$ and a threshold $T_{c,2}$ are compared in step S110. If $S_{c,2} > T_{c,2}$, the process advances to step S111, and the category index c and the classification result by the weak classifier $C_{c,2}$ are associated and stored in the classification result holding unit 705. On the other hand, if $S_{c,2} \leq T_{c,2}$, the process advances to step S114, and the processes of step S115 and subsequent steps are performed on the category next in order.

By performing the loop of steps S112 to S117 on categories corresponding to all of the category indices stored in the classification result holding unit 705, classification results (final classification result) of the categories can be acquired in the classification result holding unit 705. Hence, the weak classifier processing unit 703 outputs the final classification result of each category stored in the classification result holding unit 705 as the object classification result.

The processing time can be reduced by the above described processing and arrangement.

Next, an example of object classification processing using the weak classifiers exemplified in FIG. 2 will be described with reference to FIGS. 3 and 5.

In FIG. 3, out of the weak classifiers $C_{1,1}$ to $C_{8,1}$ and $C_{1,2}$ to $C_{8,2}$, a black circle (oblique lines) 301 indicates a weak classifier whose score is greater than the threshold, a solid line circle 302 indicates a weak classifier whose score is equal to or less than the threshold, and a dotted line circle 303 indicates a unperformed weak classifier.

Assume that a processing time of 6 cycles is necessary to perform one weak classifier. In cycle 1, processing of the weak classifier $C_{1,1}$ of category 1 in stage 1 is started, and processing of the weak classifier $C_{2,1}$ of category 2 in stage 1 is started in cycle 2. In this manner, the processes of weak classifiers $C_{1,1}$ to $C_{8,1}$ of categories 1 to 8, respectively, in stage 1 are completed in order for cycle 7 and subsequent cycles by performing pipeline processing.

Since the score of the weak classifier $C_{1,1}$ of category 1 in stage 1 does not exceed the threshold, there is no need to perform the processing of the weak classifier $C_{1,2}$ of category 1 in stage 2. In cycle 7, the processing of the weak classifier $C_{1,1}$ of category 1 in stage 1 is completed. In this case, the information (category index and classification result) of the weak classifier $C_{1,1}$ of category 1 in stage 1 is not stored in the classification result holding unit 705.

Since the score of the weak classifier $C_{2,1}$ of category 2 in stage 1 exceeds the threshold, the processing of the weak classifier $C_{2,2}$ of category 2 in stage 2 needs to be performed. In cycle 8, the processing of the weak classifier $C_{2,1}$ of category 2 in stage 1 is completed. The category index of the weak classifier $C_{2,1}$ of category 2 in stage 1 and the classification result of the weak classifier $C_{2,1}$ are associated with each other and stored in the classification result holding unit 705 which has a FIFO (First-In First-Out) arrangement. FIG. 5 shows a three-stage FIFO arrangement, and first input data d1 is stored in an entry F1, second input data d2 is stored in an entry F2, and third input data d3 is stored in an entry F3. Then, when data d4 is input next, data d2 and data d3 stored in the corresponding entries F2 and F3 are overwritten on the entries F1 and F2, respectively, and data d4 is stored in the entry F3. Subsequently, data write on the entries F1 to F3 is performed in the same manner.

Since the score of the weak classifier $C_{3,1}$ of category 3 in stage 1 exceeds the threshold, processing of the weak classifier $C_{3,2}$ of category 3 in stage 2 needs to be performed. In cycle 9, the processing of the weak classifier $C_{3,1}$ of category 3 in stage 1 is completed. The category index of the weak classifier $C_{3,1}$ of category 3 in stage 1 and the classification result of the weak classifier $C_{3,1}$ are associated with each other and stored in the classification result holding unit 705.

In cycle 9, the information (category index and classification result) of the weak classifier $C_{2,1}$ of category 2 in stage 1 and the information (category index and classification result) of the weak classifier $C_{3,1}$ of category 3 in stage 1 are stored in classification result holding unit 705.

In this manner, for each of categories 1 to 8 in stage 1, the above-described information is stored in the classification result holding unit 705 for each weak classifier whose score has exceeded the threshold. In cycle 12, information of the weak classifier $C_{6,1}$ of category 6 in stage 1 is stored in the third entry F3 of the classification result holding unit 705.

In cycle 14, since the processing of the weak classifier $C_{8,1}$ of category 8 in stage 1 is completed, the process advances to stage 2. In the case of FIG. 5, category indices of categories that have exceeded the threshold are stored in the classification result holding unit 705, the category indices are read out in the order of the entries (F1 to F3) in the respective cycles 14, 15, and 16, and the weak classifier in stage 2 is performed for each category corresponding to each category index which has been read out. In cycle 15, processing of the weak classifier $C_{2,2}$ of category 2 in stage 2 is started. Subsequently, in cycles 16 and 17, the processing of the weak classifier $C_{3,2}$ of category 3 in stage 2 and the processing of the processing of the weak classifier $C_{6,2}$ of category 6 in stage 2, respectively, are started. Therefore, processing of all the weak classifiers can be performed in the processing time of 23 cycles.

For the sake of comparison, in the example of object classification processing based on FIG. 3, the processing of a general case in which weak classifiers belonging to a category are processed for each category will be described with reference to FIG. 4. Assume also in this case that a processing time of six cycles is necessary to process one weak classifier. In cycle 1, the processing of the weak classifier of category 1 in stage 1 is started.

In a case in which weak classifiers are processed for each category, since the score of the weak classifier $C_{1,1}$ of category 1 in stage 1 does not exceed the threshold, there is no need to perform the processing of weak classifier $C_{1,2}$ of category 1 in stage 2. Since results cannot be acquired until the weak classifier processing of all categories of stage 1 is completed, whether to perform the weak classifier processing of stage 2 cannot be determined. Hence, pipeline processing cannot be performed. In cycle 7, the processing of the weak classifier $C_{1,1}$ of category 1 in stage is completed.

The processing of the weak classifier $C_{1,2}$ of category 1 in stage 2 is omitted, and the processing of the weak classifier $C_{2,1}$ of category 2 in stage 1 is started.

Since the score of the weak classifier $C_{2,1}$ of category 2 in stage 1 exceeds the threshold, the processing of the weak classifier $C_{2,2}$ of category 2 in stage 2 needs to be performed. In cycle 13, the processing of the weak classifier $C_{2,1}$ of category 2 in stage 1 is completed, and the processing of the weak classifier $C_{2,2}$ of category 2 in stage 2 is started. As a result, a time of 67 cycles is necessary to process all the weak classifiers.

As described above, according to the first embodiment, a weak classifier of each category is performed by pipeline processing for each stage, and each category in which a weak classifier is to be performed in the next stage is decided based on the result of each performance. Hence, the categories in which the weak classifiers are to be performed in the next stage can be confirmed at an early period, and the weak classifiers can also be performed by pipeline processing in the next stage. This can increase the processing speed.

Additionally, in the first embodiment, since the weak classifier processing of stage 2 is started after the weak classifier processing of stage 1 is completed, the control of the apparatus and the arrangement of the classification result holding unit 705 become simpler than in the second embodiment (to be described later).

<Modification>

As described above, the dictionary data of the weak classifier is not limited to the pixel position of one pixel on an input image. For example, it can be one or more pixel positions of a plurality of images or one or more positions in a time-series space when processing a moving image.

The method of obtaining a score $S_{c,i}$ is also not limited to the above-described method. For example, the score $S_{c,i}$ can be obtained by using a plurality of pairs of coordinates in a plurality of images and a function indicated by the LUT data. The input image can also be an integrated image or a feature image.

Second Embodiment

Differences from the first embodiment will be mainly described below. Unless otherwise specified, details are the same as in the first embodiment. The state of each cycle in object classification processing in a case in which the state of the weak classifier in each category changes to a state exemplified in FIG. 3 as a result of performing weak classifier processing will be described with reference to FIG. 8.

In cycle 1, the processing of a weak classifier $C_{1,1}$ of category 1 in stage 1 is started, and the processing of a weak classifier $C_{2,1}$ of category 2 in stage 1 is started in cycle 2. By performing pipeline processing in this manner, processing of weak classifiers $C_{1,1}$ to $C_{8,1}$ of categories 1 to 8, respectively, in stage 1 are sequentially completed from cycle 7.

In cycle 7, the processing of the weak classifier $C_{1,1}$ of category 1 in stage 1 is completed. Since the score of the weak classifier $C_{1,1}$ of category 1 in stage 1 does not exceed the threshold, there is no need to perform the processing of a weak classifier $C_{1,2}$ of category 1 in stage 2, and the information of the weak classifier $C_{1,1}$ of category 1 in stage 1 is not stored in a classification result holding unit 705.

In cycle 8, the processing of the weak classifier $C_{2,1}$ of category 2 in stage 1 is completed. Since the score of the weak classifier $C_{2,1}$ of category 2 in stage 1 exceeds the threshold, the processing of a weak classifier $C_{2,2}$ of category 2 in stage 2 needs to be performed, and the information of the weak classifier $C_{2,1}$ of category 2 in stage 1 is stored in the classification result holding unit 705.

In cycle 9, together with reading out the object classification result of the weak classifier $C_{2,1}$ from the classification result holding unit 705 and starting the processing of the weak classifier $C_{2,2}$, the processing of the weak classifier $C_{3,1}$ is completed. Since the score of the weak classifier $C_{3,1}$ exceeds the threshold, information of the weak classifier $C_{3,1}$ is stored in the classification result holding unit 705.

In this manner, in cycle 9, both "reading out the object classification result of the weak classifier $C_{3,1}$ from the classification result holding unit 705" and "storing the information of the weak classifier $C_{3,1}$ in the classification result holding unit 705" are performed. In cycle 9, since the object classification result of the weak classifier $C_{2,1}$ was read out, only the information of the weak classifier $C_{3,1}$ is stored in the classification result holding unit 705.

In cycle 10, together with reading out the object classification result of the weak classifier $C_{3,1}$ from the classification result holding unit 705 and starting the processing of a weak classifier $C_{3,2}$, the processing of the weak classifier $C_{4,1}$ is completed. Since the score of the weak classifier $C_{4,1}$ does not exceed the threshold, information of the weak classifier $C_{4,1}$ is not stored in the classification result holding unit 705.

In this manner, in the second embodiment, the information of each weak classifier whose score exceeds the threshold is stored in the classification result holding unit 705 and the object classification results are read out from the classification result holding unit 705 for categories 1 to 8 in stage 1. As described in cycle 9, by starting the weak classifier processing of stage 2 before the weak classifier processing of stage 1 is completed, the efficiency of pipeline processing can be improved. Subsequently, the processing of a weak classifier $C_{6,2}$ is completed in cycle 18. Therefore, all the classifiers can be processed in 18 cycles.

In this manner, according to the second embodiment, since the processing of the weak classifiers of stage 2 can be started earlier than in the first embodiment, the processing time can be reduced.

Third Embodiment

Differences from the first embodiment will be mainly described below. Unless otherwise specified, details are the same as in the first embodiment. In the first embodiment, there was no particular reference in deciding a category to process first. In the third embodiment, the performance order of a weak classifier in each category in stage 1 is preset and information indicating the set performance order is stored in an initialization information holding unit 706 so that a category having a high possibility that the object classification processing will reach stage 2 is processed first in stage 1. This setting can be made in advance by a statistical method or the like.

An example of object classification processing using the weak classifiers exemplified in FIG. 2 will be described with reference to FIGS. 9 and 10.

Figure 9:
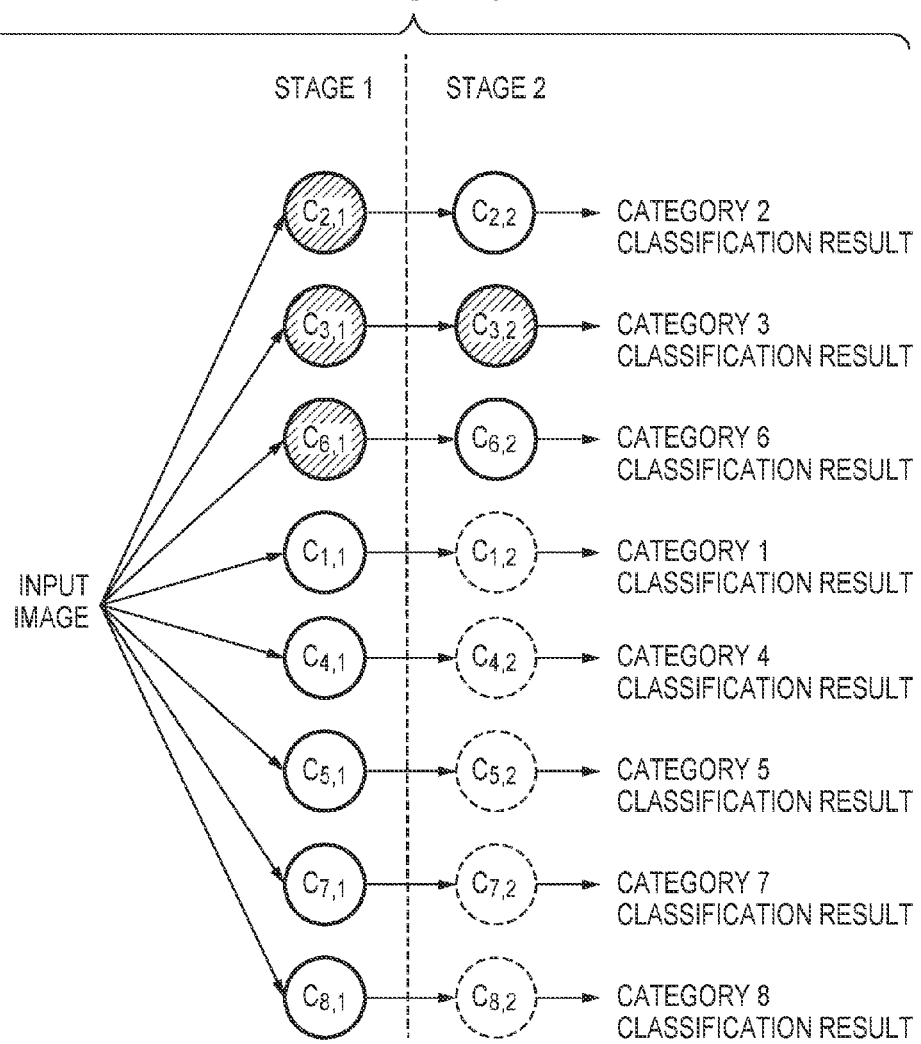
FIG. 9 is a view for explaining object classification processing.

In FIG. 9, out of weak classifiers $C_{1,1}$ to $C_{8,1}$ and $C_{1,2}$ to $C_{8,2}$, a black circle (oblique lines) 901 indicates a weak classifier whose score is greater than the threshold, a solid line circle 902 indicates a weak classifier whose score is equal to or less than the threshold, and a dotted line circle 903 indicates a unperformed weak classifier. In FIG. 9, the performance order of categories of categories 1 to 8 is decided so that categories (categories 2, 3, 6) having a high possibility that the object classification processing will reach stage 2 are processed first in stage 1 before other categories. In FIG. 9, processing is performed in the order of category 2, 3, 6, 1, 4, 5, 7, and 8 in state 1. Since such an arrangement will allow the information of a weak classifier of a category having a high possibility that the processing will reach stage 2 to be stored in a classification result holding unit 705 earlier than in the first embodiment, the weak classifiers of stage 2 can be processed earlier.

As shown in FIG. 10, the processing of the weak classifier $C_{2,1}$ is started in cycle 1, the processing of the weak classifier $C_{3,1}$ is started in cycle 2, and the processing of the weak classifier $C_{6,1}$ is started in cycle 3. In this manner, by performing pipeline processing in the order of categories based on the pre-decided performance order, the processes of the weak classifiers $C_{1,1}$ to $C_{8,1}$ are completed in the order of categories based on the performance order indicated by the information stored in the initialization information holding unit 706 from cycle 7.

As described above, the performance order corresponds to the degree of possibility that the object classification processing of a category will pass to the next stage and is acquired by using a plurality of pieces of evaluation data in advance. This order can be decided by statistical data, the classification result of the previous frame, classification result of a neighboring frame, the degree of similarity of the category, and the like.

In cycle 7, the processing of the weak classifier $C_{2,1}$ is completed. Since the score of the weak classifier $C_{2,1}$ exceeds the threshold, the information of the weak classifier $C_{2,1}$ is stored in the classification result holding unit 705.

In cycle 8, the processing of the weak classifier $C_{3,1}$ is completed. Since the score of the weak classifier $C_{3,1}$ exceeds the threshold, the information of the weak classifier $C_{3,1}$ is stored in the classification result holding unit 705.

In cycle 9, together with reading out the object classification result of the weak classifier $C_{2,1}$ from the classification result holding unit 705 and starting the processing of the weak classifier $C_{2,2}$, the processing of the weak classifier $C_{6,1}$ is completed. Since the score of the weak classifier $C_{6,1}$ exceeds the threshold, information of the weak classifier $C_{6,1}$ is stored in the classification result holding unit 705.

In cycle 10, together with reading out the object classification result of the weak classifier $C_{3,1}$ from the classification result holding unit 705 and starting the processing of the weak classifier $C_{3,2}$, the processing of the weak classifier $C_{1,1}$ is completed. Since the score of the weak classifier $C_{1,1}$ does not exceed the threshold, information of the weak classifier $C_{1,1}$ is not stored in the classification result holding unit 705.

In cycle 11, the object classification result of the weak classifier $C_{6,1}$ is read out from the classification result holding unit 705 and the processing of the weak classifier $C_{6,2}$ is started. By such an arrangement, the processing of the weak classifier $C_{6,2}$ can be started one cycle before in the third embodiment than in the second embodiment. In addition, in cycle 11, the processing of the weak classifier $C_{4,1}$ is completed. Since the score of the weak classifier $C_{4,1}$ does not exceed the threshold, the information of the weak classifier $C_{4,1}$ is not stored in the classification result holding unit 705.

In this manner, in the third embodiment, for each of categories 1 to 8 in stage 1, the information of each weak classifier whose score exceeds the threshold is stored in the classification result holding unit 705 and the corresponding object classification result is read out from the classification result holding unit 705. Such an arrangement allows the weak classifiers in stage 2 to be processed earlier than in the first embodiment, thereby further improving the efficiency of the weak classifier processing. Subsequently, in cycle 17, the processing of the weak classifier $C_{6,2}$ is completed. Therefore, all the weak classifiers can be processed in a processing time of 17 cycles.

In this manner, according to the third embodiment, since a weak classifier of a category having a high possibility that the object classification processing will pass to stage 2 is processed with priority, the efficiency of pipeline processing can be improved.

First Modification of Above-Described Embodiments

A "category of an object" in the above-described embodiments can be anything as long as it is an object attribute capable of being categorized into some number of pieces. For example, it can be the various orientations of an object. In addition, the same type of objects having different object sizes, directions and illumination or different types of objects can be set as targets, and the size, illumination direction, and the type of the target object can also be used as the "category of an object".

Second Modification of Above-Described Embodiments

Figure 11:
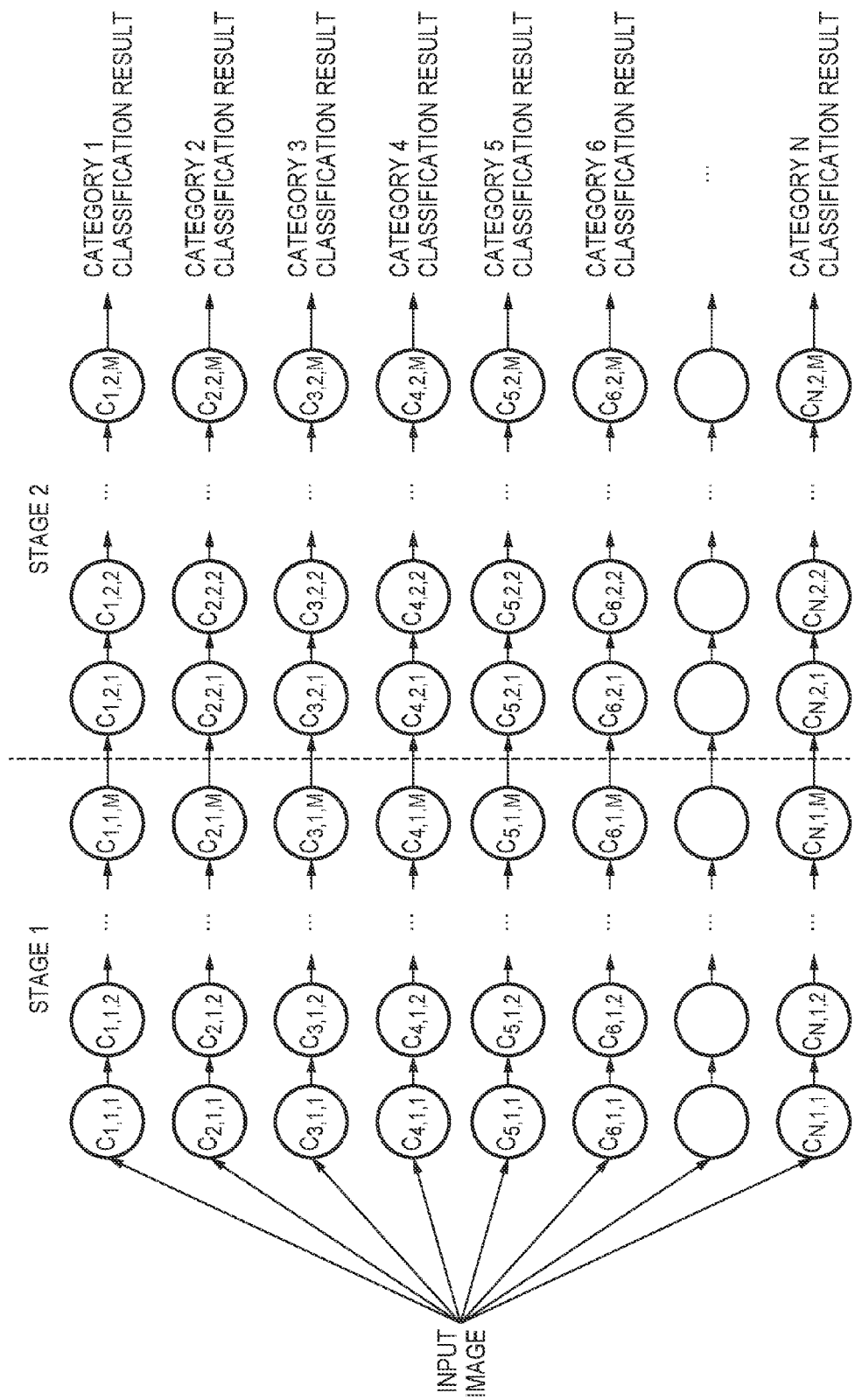
FIG. 11 is a view showing an arrangement in which a plurality of weak classifiers are provided on stage 1 and stage 2.

In the above described embodiments, although one weak classifier was provided for each category in both stages 1 and 2, a plurality of weak classifiers can be provided for each category in both stages. FIG. 11 shows an arrangement in which a plurality of weak classifiers have been provided in the respective stages 1 and 2. In FIG. 11, M (M is an integer of 3 or more) weak classifiers have been provided in each of the stages 1 and 2. In FIG. 11, $C_{c,i,j}$ ($1 \leq c \leq N$, $1 \leq i \leq 2$, $1 \leq j \leq M$ in FIG. 11) represents the jth weak classifier from the left side (from the input side) belonging to weak classifiers of a category c in stage i.

In this case, the processing according to the flowchart of FIG. 1 can be modified in the following manner.

In step S106 (in step S104), the weak classifier processing unit 703 reads out pieces of dictionary data $D_{c,1,1}$ to $D_{c,1,M}$ corresponding to weak classifiers $C_{c,1,1}$ to $C_{c,1,M}$ from the RAM 704. The property of dictionary data is the same as that described in the first embodiment.

In step S107 (in step S104), the weak classifier processing unit 703 reads out pixel values f ($X_{c,1,1}$, $Y_{c,1,1}$) to f ($X_{c,1,M}$, $Y_{c,1,M}$) of pixel positions indicated by the respective pieces of dictionary data $D_{c,1,1}$ to $D_{c,1,M}$ in the input image stored in the buffer 701.

In step S108 (in step S104), the weak classifier processing unit 703 reads out pieces of LUT data respectively corresponding to the weak classifiers $C_{c,1,1}$ to $C_{c,1,M}$ from the RAM 704. In this case, assume that LUT data which corresponds to the weak classifier $C_{c,i,j}$ is "data that represents a function to convert an image feature amount (a pixel value in this case) of the weak classifier $C_{c,i,j}$ read out in step S107 into a score corresponding to the likelihood of the target object".

In step S109 (in step S104), the weak classifier processing unit 703 obtains scores $S_{c,1,1}$ to $S_{c,i,M}$ (refer to equation (4) below) of the respective weak classifiers $C_{c,1,1}$ to $C_{c,1,M}$ by respectively converting the pixel values f ($X_{c,1,1}$, $Y_{c,1,1}$) to f ($X_{c,1,M}$, $Y_{c,1,M}$) by using functions $L_{c,1,1}$ to $L_{c,1,M}$ that are indicated by pieces of LUT data corresponding to the respective weak classifiers $C_{c,1,1}$ to $C_{c,1,M}$. Then, the total value of the scores $S_{c,1,1}$ to $S_{c,1,M}$ obtained in this manner is obtained as the score $S_{c,1}$ of category c in stage 1 as:

$$S_{c,i} = \Sigma_j L_{c,i,j}(f(X_{c,i,j}, Y_{c,i,j})) \quad (3)$$

$$S_{c,i,j} = L_{c,i,j}(f(X_{c,i,j}, Y_{c,i,j})) \quad (4)$$

The subsequent processing is the same as in the first embodiment. Note that if processes of steps S106 to S111 are to be performed in step S116, the above-described modification of the steps S106 to S109 will be performed in or after stage 2.

Note that in step S109, the scores $S_{c,1,1}$ to $S_{c,1,M}$ can be obtained by using equation (4) and if the scores $S_{c,1,1}$ to $S_{c,1,M}$ exceed the respective thresholds $T_{c,1,1}$ to $T_{c,1,M}$ (thresholds corresponding to the respective weak classifiers $C_{c,1,1}$ to $C_{c,1,M}$) in step S110, the process can advance to step S111.

Third Modification of Above-Described Embodiments

Figure 12:
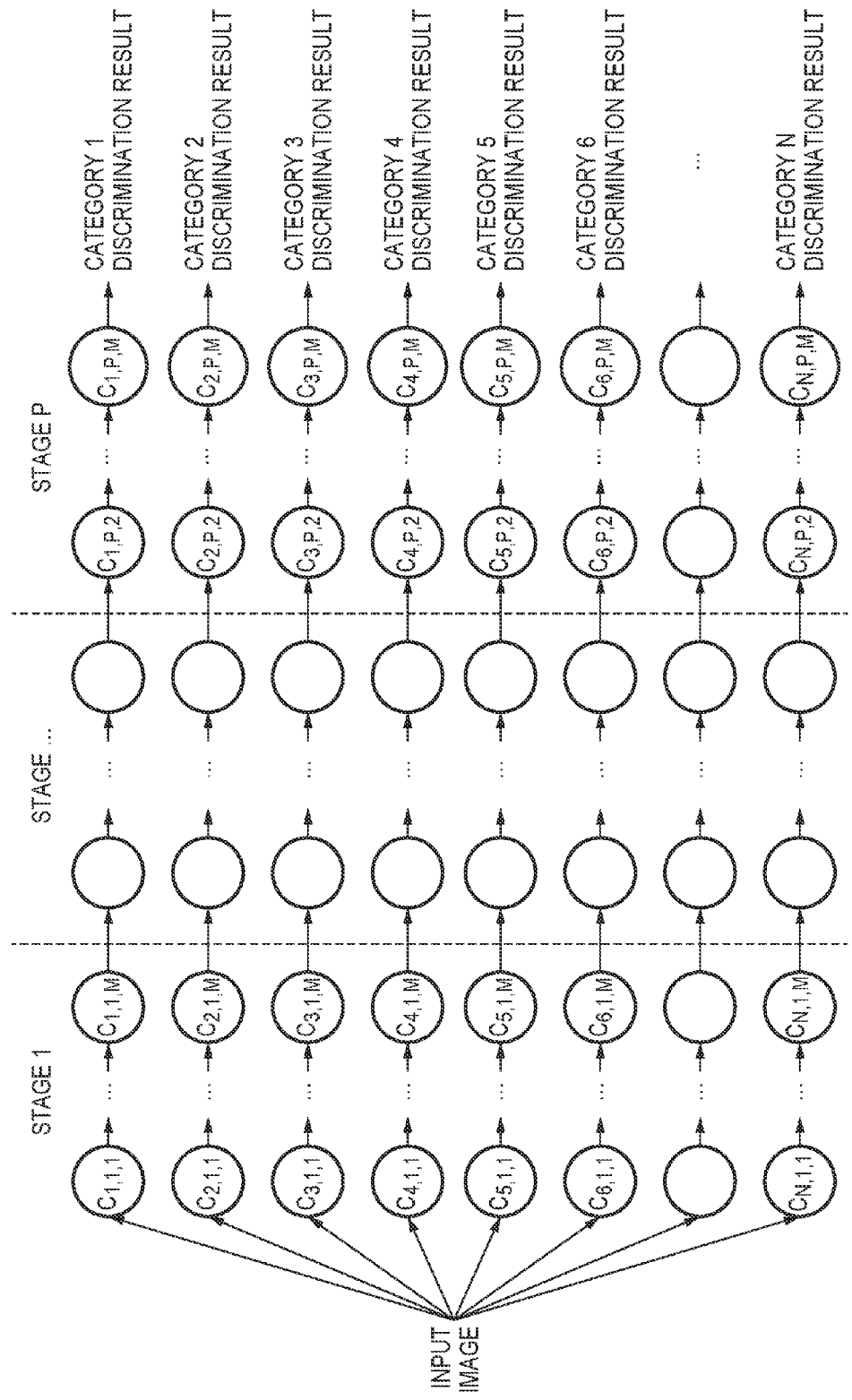
FIG. 12 is a view showing an arrangement in which the number of stages is P (P is an integer of 3 or more).

Although there were two stages in the above-described embodiments, the number of stages is not limited to two. The number of stages can be three or more. FIG. 12 shows an arrangement in which there are P (P is an integer of 3 or more) stages. In addition, a plurality of (M) weak classifiers have been provided for each stage in FIG. 12.

Fourth Embodiment

Figure 7:
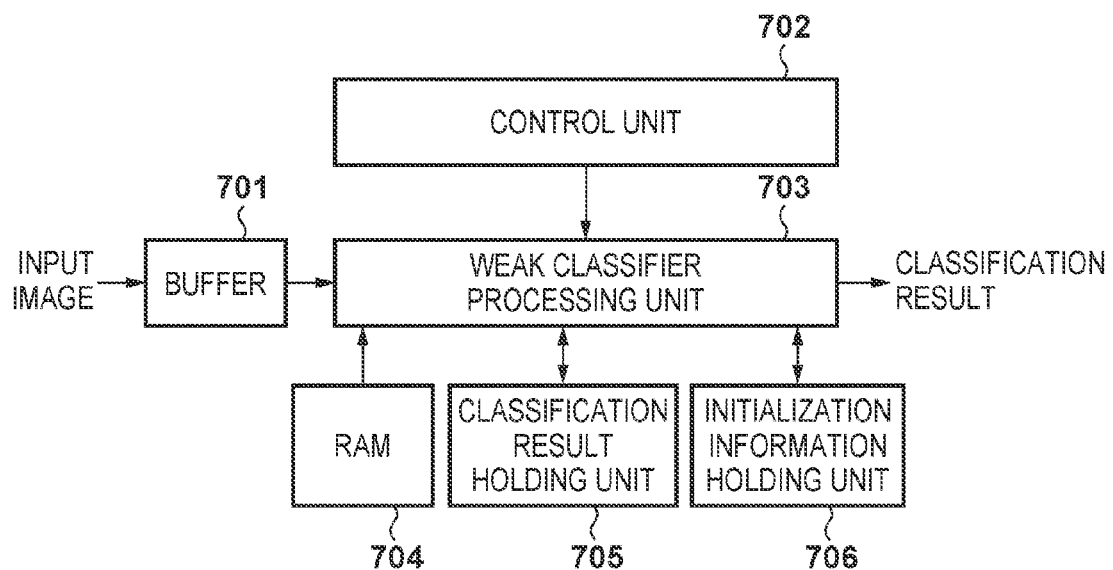
FIG. 7 is a block diagram showing an example of the arrangement of the object classification apparatus.

In the arrangement shown in FIG. 7, a weak classifier processing unit 703 can have a hardware arrangement if a buffer 701, a RAM 704, a classification result holding unit 705, and an initialization information holding unit 706 each are formed by one or more memories and a control unit 702 is formed by a processor such as a CPU or the like. The weak classifier processing unit 703 may have, however, a software arrangement as well.

An example of a hardware arrangement of a computer apparatus applicable to an object classification apparatus in any case will be described with reference to the block diagram of FIG. 6.

An input unit 601 can be any type of a device as long as it is a device capable of inputting computer programs and data into the main apparatus. The input unit 601 is, for example, a keyboard and mouse that are operated by the user to input various instructions and information into the main apparatus or a device (such as a digital camera) for inputting an input image into the main apparatus.

A data storage unit 602 is formed from at least one memory device such as a hard disk, a flexible disk, a CD-ROM, a CD-R or DVD, a memory card, a CF card, a smart medium, an SD card, a memory stick, an xD picture card, a USB memory, and the like, and is a memory device capable of functioning as the buffer 701, the classification result holding unit 705, and the initialization information holding unit 706 of FIG. 7. The data storage unit 602 stores an OS (Operating System) and various computer programs and data. If the weak classifier processing unit 703 is to be configured by software, the computer programs will include a computer program for causing a CPU 605 to perform the processes described above as processes that are to be performed by the weak classifier processing unit 703. The data includes input image data and information (such as a threshold) handled as known information in the above description. The computer programs and data stored in the data storage unit 602 are appropriately loaded to a RAM 607 under the control of the CPU 605 and processed by the CPU 605.

Note that the RAM 607 may be partially used as the data storage unit 602 or if a storage device as a communication partner device of a communication unit 603 is to be used via the communication unit 603, this storage device may be used as the data storage unit 602.

The communication unit 603 is for performing data communication with an external device via a network, such as a LAN or the internet, and downloads, from the external device, the computer programs and data that were described as being stored in the data storage unit 602.

A display unit 604 is constituted by a CRT, a liquid crystal screen, a touch panel, or the like and can display processing results of the CPU 605 as an image, characters, or the like. Note that if the display unit 604 is a touch panel screen, it can also serve as a user input accepting function of the input unit 601.

The CPU 605 functions as the above-described control unit 702. The CPU 605 performs processing by using the computer programs and data stored in the RAM 607 and a ROM 606, thereby controlling the operation of the entire main apparatus. In addition, the CPU 605 performs or controls the processes described above as those to be performed by the object classification apparatus. Note that, there can be a single CPU 605 or a plurality of CPUs 605.

The ROM 606 stores the setting data, the boot program, and the like of the main apparatus.

The RAM 607 functions as the above-described RAM 704. The RAM 607 has an area for storing the computer programs and data loaded from the data storage unit 602 and the ROM 606 and the computer programs and data downloaded from an external device by the communication unit 603. In addition, the RAM 607 has a work area used by the CPU 605 and a classification processing unit 608 to perform various kinds of processing. In other words, the RAM 607 can appropriately provide various kinds of areas.

The classification processing unit 608 functions as the above-described weak classifier processing unit 703 and operates based on an instruction from the CPU 605. More specifically, upon receiving an instruction to start the processing from the CPU 605, the classification processing unit 608 performs object classification processing using an input image stored in the RAM 607 and outputs the processing result to the RAM 607. The CPU 605 performs processing such as image processing or image recognition by using the object classification processing result output from the classification processing unit 608 to the RAM 607. The processing result of the CPU 605 can be stored in the RAM 607 or the data storage unit 602 or output to an external device via the communication unit 603.

Figure 6:
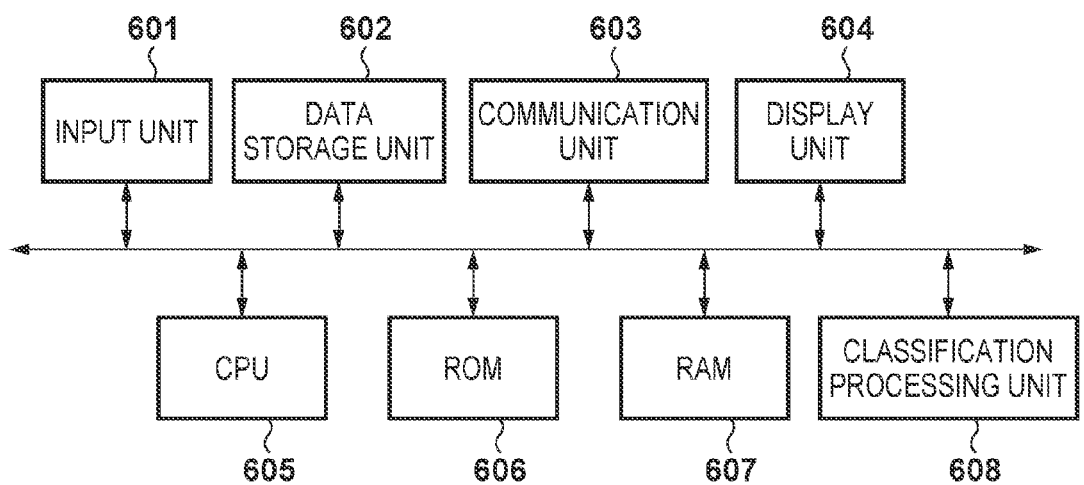
FIG. 6 is a block diagram showing an example of the hardware arrangement of a computer apparatus.

Note that, although the input unit 601, the data storage unit 602, and the display unit 604 are all included in a single apparatus in the arrangement shown in FIG. 6, these functional units can be connected by a communication path using a known communication method and constitute a same kind of arrangement as a whole.

In addition, some or all of the embodiments and modifications described above may be appropriately used in combination or some of the embodiments and modifications may be eliminated and used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-093516, filed Apr. 30, 2015, which is hereby incorporated by reference herein in its entirety.

What is claimed is:

1. An information processing apparatus comprising:
at least one memory which stores instructions; and
one or more processors which execute the instructions to cause the information processing apparatus to:
implement a plurality of sequences of weak classifiers which are logically cascade-connected in each sequence, wherein the sequences respectively correspond to a plurality of categories of an object and the plurality of weak classifiers are grouped into at least a first group and a second group in the order of connection;
control to perform, by pipeline processing, classification processing by weak classifiers belonging to the first group in the sequences respectively corresponding to the plurality of categories;
decide, based on results of classification processing by the weak classifiers belonging to the first group in the sequences respectively corresponding to the plurality of categories, categories for which classification processing are to be performed by weak classifiers belonging to the second group out of the plurality of categories; and
control to perform, by pipeline processing, classification processing by the weak classifiers belonging to the second group in sequences respectively corresponding to the decided categories.

2. The apparatus according to claim 1, wherein the one or more processors further cause the information processing apparatus to obtain evaluation values of the results of classification processing by the weak classifiers belonging to the first group in sequences respectively corresponding to the plurality of categories and decide, based on the evaluation values, a category for which classification processing are to be performed by the weak classifiers belonging to the second group out of the plurality of categories.

3. The apparatus according to claim 2, wherein the one or more processors further cause the information processing apparatus to decide categories in which the respective evaluation values exceed a threshold as the categories for which classification processing are to be performed by the respective weak classifiers belonging to the second group.

4. The apparatus according to claim 2, wherein the first group includes a plurality of weak classifiers in a sequence corresponding to the same category, and
the one or more processors further causes the information processing apparatus to obtain evaluation values of results of classification processing by the respective weak classifiers belonging to the first group in a sequence corresponding to a given category and decide the given category as the category for which classification processing are to be performed by the weak classifiers belonging to the second group if any of the evaluation values of the results of classification processing by the respective weak classifiers exceeds a threshold.

5. The apparatus according to claim 2, wherein the first group includes a plurality of weak classifiers for each category, and
wherein the one or more processors further cause the information processing apparatus to obtain evaluation values of results of classification processing by the respective weak classifiers belonging to the first group in a sequence corresponding to a given category and decide the given category as the category for which classification processing are to be performed by the weak classifiers belonging to the second group if a total value of the evaluation values of the results of the classification processing by the respective weak classifiers exceeds a threshold.

6. The apparatus according to claim 1, wherein the one or more processors further cause the information processing apparatus to control to first perform, by pipeline processing, classification processing by the weak classifiers belonging to the first group in a sequence of a category preset as a category having a high possibility that classification processing by the weak classifiers belonging to the second group will be performed.

7. The apparatus according to claim 1, wherein the one or more processors further cause the information processing apparatus to control to start classification processing by the weak classifiers belonging to the second group prior to completion of classification processing by all of the weak classifiers belonging to the first group.

8. An information processing method performed by an information processing apparatus that includes a plurality of sequences of weak classifiers which are logically cascade-connected in each sequence and the sequences respectively correspond to a plurality of categories of an object and in which the plurality of weak classifiers are grouped into at least a first group and a second group in the order of connection, comprising:
performing, by pipeline processing, classification processing by weak classifiers belonging to the first group in the sequences respectively corresponding to the plurality of categories;
deciding, based on results of classification processing by the weak classifiers belonging to the first group in the sequences respectively corresponding to the plurality of categories, categories for which classification processing are to be performed by weak classifiers belonging to the second group out of the plurality of categories; and performing, by pipeline processing, classification processing by the weak classifiers belonging to the second group in sequences respectively corresponding to the decided categories.

9. A non-transitory computer-readable storage medium storing a computer program for causing a computer to:

implement a plurality of sequences of weak classifiers which are logically cascade-connected in each sequence, wherein the sequences respectively correspond to a plurality of categories of an object and the plurality of weak classifiers are grouped into at least a first group and a second group in the order of connection;

control to perform, by pipeline processing, classification processing by weak classifiers belonging to the first group in the sequences respectively corresponding to the plurality of categories;

decide, based on results of classification processing by the weak classifiers belonging to the first group in the sequences respectively corresponding to the plurality of categories, categories for which classification processing are to be performed by weak classifiers belonging to the second group out of the plurality of categories; and control to perform, by pipeline processing, classification processing by the weak classifiers belonging to the second group in sequences respectively corresponding to the decided categories.

* * * * *